Nov. 24, 1964 C. I. WASSERMAN 3,158,090
HIGH SPEED HAMMER PRINTERS WITH CODE SIGNAL MEANS
Original Filed Oct. 5, 1960 3 Sheets-Sheet 1
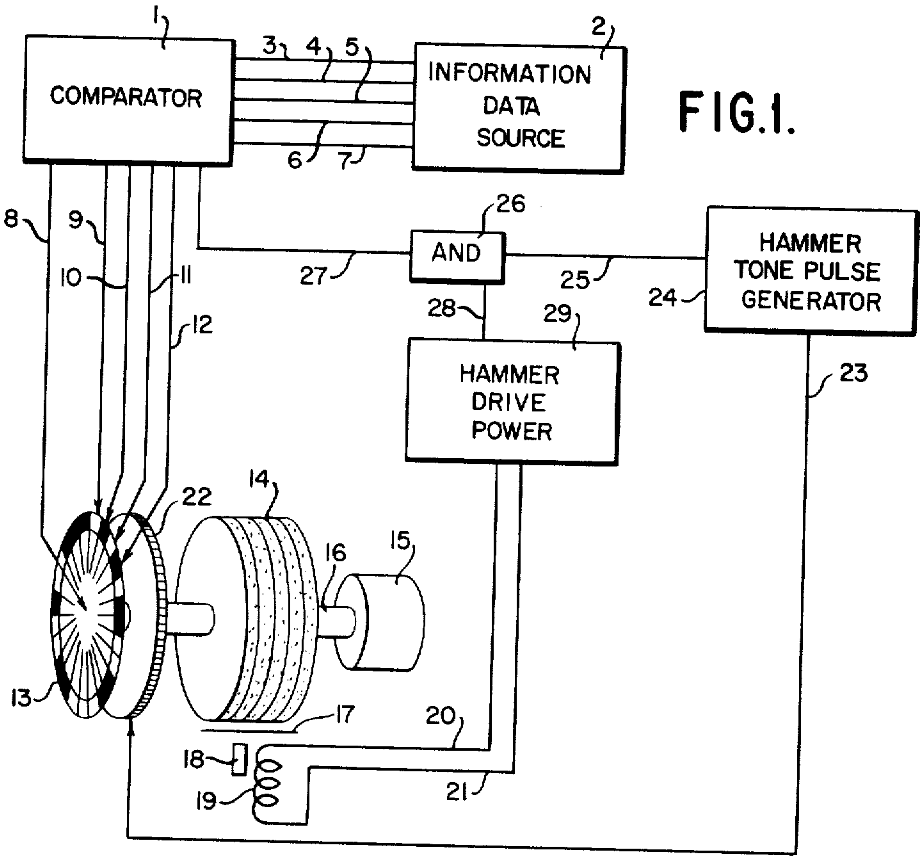
FIG. 1.
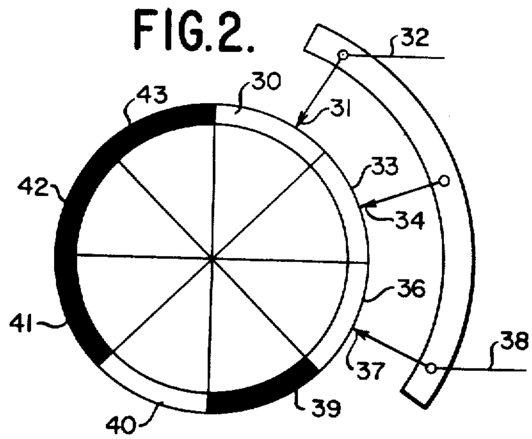
FIG. 2.
FIG. 3.
| POSITION | BINARY CODE NUMBER |
|---|---|
| 1 | 0 |
| 2 | 1 |
| 3 | 2 |
| 4 | 5 |
| 5 | 6 |
| 6 | 7 |
| 7 | 3 |
| 8 | 4 |
INVENTOR.
CARL I. WASSERMAN
BY
Douglas M. Clarkson
ATTORNEY Nov. 24, 1964 C. I. WASSERMAN 3,158,090

HIGH SPEED HAMMER PRINTERS WITH CODE SIGNAL MEANS

Original Filed Oct. 5, 1960

3 Sheets-Sheet 2

| WHEEL POSITION | DECIMAL EQUIVALENT | BINARY CODE |
|---|---|---|
| 0 | 0 | 00000 |
| 1 | 1 | 00001 |
| 2 | 2 | 00010 |
| 3 | 4 | 00100 |
| 4 | 9 | 01001 |
| 5 | 18 | 10010 |
| 6 | 5 | 00101 |
| 7 | 10 | 01010 |
| 8 | 21 | 10101 |
| 9 | 11 | 01011 |
| 10 | 22 | 10110 |
| 11 | 12 | 01100 |
| 12 | 25 | 11001 |
| 13 | 19 | 10011 |
| 14 | 7 | 00111 |
| 15 | 14 | 01110 |
| 16 | 29 | 11101 |
| 17 | 26 | 11010 |
| 18 | 20 | 10100 |
| 19 | 8 | 01000 |
| 20 | 17 | 10001 |
| 21 | 3 | 00011 |
| 22 | 6 | 00110 |
| 23 | 13 | 01101 |
| 24 | 27 | 11011 |
| 25 | 23 | 10111 |
| 26 | 15 | 01111 |
| 27 | 31 | 11111 |
| 28 | 30 | 11110 |
| 29 | 28 | 11100 |
| 30 | 24 | 11000 |
| 31 | 16 | 10000 |

INVENTOR.
CARL I. WASSERMAN

BY Douglas M. Clarkson

ATTORNEY

INVENTOR.
CARL I. WASSERMAN
BY
Douglas M. Clarkson
ATTORNEY

United States Patent Office 3,158,090

Patented Nov. 24, 1964

3,158,090

HIGH SPEED HAMMER PRINTERS WITH CODE SIGNAL MEANS

Carl I. Wasserman, Queens Village, N.Y., assignor to Potter Instrument Co., Inc., Plainview, N.Y., a corporation of New York Continuation of application Ser. No. 60,601, Oct. 5, 1960. This application Nov. 21, 1963, Ser. No. 329,936 (Filed under Rule 47(b) and 35 U.S.C. 118)
4 Claims. (Cl. 101—93)

The present invention concerns high speed printing devices and, in particular, methods of and means for providing simplified controls and logic in a high speed drum or type wheel printer.

In the electronic computer and allied fields it is often necessary to print out information at extremely high rates. This information is usually in coded form. For example, each character may be represented by a number according to a predetermined code. Since the code may readily be translated into a binary number, it becomes a simple matter to represent a coded character by its corresponding binary number. This representation of a coded character by a binary number leads to a simple and direct way of utilizing coded characters to actuate high speed printers.

The high speed printer of the present invention utilizes a type wheel carrying lines of type. Axially, a line of type is a repetition of the same character while peripherally each line position carries a different character. If the character code used is a four level code, 0000 will represent a certain character which may also be expressed by the binary number 0000. Similarly, the character represented by code 0010 becomes binary 0010, coded character 0101 becomes binary 0101, and so on. If the type wheel is rotated and is provided with a row of printing hammers along a predetermined line, the first or 0000 code and corresponding binary 0000 will apply to this first line position of the type wheel when opposite the line of the printing hammers. If now the type wheel is rotated one line position and a binary counter is used to count the successive type line positions, the next line position after 0000 will be 0001. In this line on the type wheel is placed a row of the character which code 0001 represents. In the same way the next type line will contain characters represented by 0010 and so on. In order to generate a coded signal which represents the character in each line it is merely necessary to count the type line positions successively with a binary counter having a parallel output, directly providing a 1–2–4–8 or other code. This mode of operation is shown and described in application for Letters Patent of Carl I. Wasserman entitled "Logical System for High Speed Printer" filed on May 27, 1960 bearing Serial Number 32,333, now Patent No. 3,024,723. The present invention concerns a simplified method of and means for generating character representing coded signals eliminating the need for the expense and complication of providing an electronic counter. This code signal generation is accomplished with a code wheel attached to the type wheel and rotating with it and carrying signal generating means such as conducting segments, magnetic teeth, optical openings, etc. These segments or teeth are so arranged that, six pick off devices for a six level code for example, generate position by position all the corresponding code numbers representing the correspondingly positioned character on the type wheel. The character code representing signals may be compared directly with the coded information to be printed and print instructions issued when a match is found. Printing hammers may be energized when print instruction exist and a hammer tone signal is present in an "and' circuit. The hammer tone provides a pulse each time the character wheel reaches a possible print position opposite a hammer. Thus a simple code wheel replaces a considerable amount of equipment including an electronic counter with special read-out provisions. In a conventional system this counter constitutes a considerable proportion of the cost.

Accordingly, one object of the present invention is to provide a method of and means for generating code signals representing coded characters on a print wheel or the like.

Another object is to provide code generators capable of generating any 3, 4, 5 or 6 level code or the like merely by changing a simple code wheel.

Still another object is to simplify the operation of type wheel printers utilizing coded input information.

These and other objects will be apparent from the detailed description of the invention given in connection with the various figures of the drawing.

In the drawing:

FIG. 1 shows, partly in block diagram, a type wheel printing system embodying the present invention.

FIG. 2 shows a code wheel for a 3 level code.

FIG. 3 shows a table of values for the code wheel of FIG. 2.

Figures 4, 5:
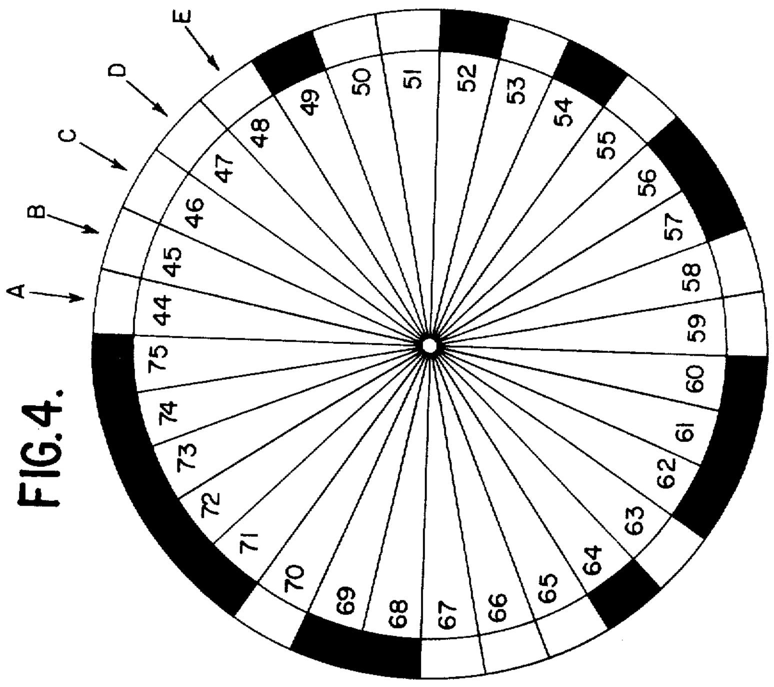
FIG. 4 shows a code wheel for a 5 level code.
FIG. 5 shows a table of values for the code wheel of FIG. 4.

FIG. 1 shows comparator 1 which receives coded information from information source 2 over leads 3, 4, 5, 6 and 7 representing a 4 level code fed in parallel from the information source to the comparator. The comparator also receives 4 level coded information from code wheel 13 over leads 9, 10, 11 and 12 and common lead 8. Code wheel 13 is carried on a common shaft 16 of drive motor 15 along with a plurality of type wheels 14 and hammer tone wheel 22. Printing is accomplished by actuating print hammer 18 which impresses paper sheet 17 on a selected type face. While a print hammer is provided for each type wheel, only one is shown for simplicity. Print hammer 18 is energized by coil 19 receiving power over leads 20 and 21 from the source of hammer drive power 29. A hammer tone wheel 22 also on shaft 16 and turned with the type wheels generates a hammer tone when pulses are picked up by pick-up device 23 and act through hammer tone pulse generator 24 the output of which is fed to AND gate 26 over lead 25. When an output pulse from comparator 1 indicating a match between information from source 2 and code wheel signals is fed to AND gate 26 over lead 27, and a hammer tone pulse is received, the AND gate 26 produces an output over lead 28 to the source of hammer drive power 29. This output causes hammer power to be generated and feeding over leads 20–21 energize hammer coil 19 driving hammer 18 to print on paper 17 in accordance with the character opposite it on the type wheel.

The contact combinations provided by code wheel 13 uniquely represent the characters on the type wheels so that as the wheels and disk are turned the code generated at any given position represents the character opposite the print hammer. Thus, as the code and type wheels are turned, codes are successively generated representing successively the type characters opposite the hammers in printing position. The mode in which the code wheel generates character representing signals will be clear from FIGS. 2 and 3.

FIG. 2 shows a code wheel having segments 30–33–36–39–40–41–42–43 which are to be taken as conducting when dark (39–41–42–43) and non-conducting when light (30–33–36–40). Now if three spaced contacts 31, 34 and 37 are provided spaced apart by an amount equal to the arc of the wheel segments, circuits will be provided over leads 32–35–38 as shown in FIG. 2. Binary values are assigned to these contacts one being assigned to 37, two to 34 and four to 31. If the code wheel is rotated counterclockwise it will successively assume binary coded numbers as shown in FIG. 3. In position 1 (as shown) no contacts are made and the code number represented is zero. In position 2, contact 37 will close on conducting segment 39 representing code number one. In position 3, contact 34 will close on segment 39 representing code number two. In position 4, contact 37 closes on segment 41, contact 34 is open on segment 40 and contact 31 closes on conducting segment 39 thus representing code number one plus four or five. In the same manner rotation may be continued generating code numbers six, seven, three and four in succession as shown. The code wheel of FIG. 2 may be taken to be useful in representing a three level code or any code having up to eight different values which may represent up to eight characters of type on a type wheel. For example in place of numbers one through eight and zero eight different letters or other characters may be represented.

With the above explanation it will be seen that FIG. 4 shows a code wheel for generating 32 characters possible in a five bit code or its equivalent. FIG. 4 shows the code numbers, code contacts or binary representation for all 32 possible wheel positions for clockwise rotation.

To recapitulate, the present invention shows a method of and means for simplifying a type wheel printer. As the type wheel turns, a code wheel turns with it carrying on its periphery contacts or teeth or slots which when scanned with a number of contacts, pick-ups or photo cells represent the particular character which appears step by step opposite the printing hammer. No counter or other additional apparatus is required. One significant further advantage is that the system is substantially fool-proof since the code generated is unique in representing the hammer oriented character and does not depend on counting, proper starting point, etc. A single disk or wheel with a contact or pick-up for each bit of a code is all that is required to generate the code. The hammer tone wheel and its coaction is required to insure accurate registration of a printed character.

Figure 6:
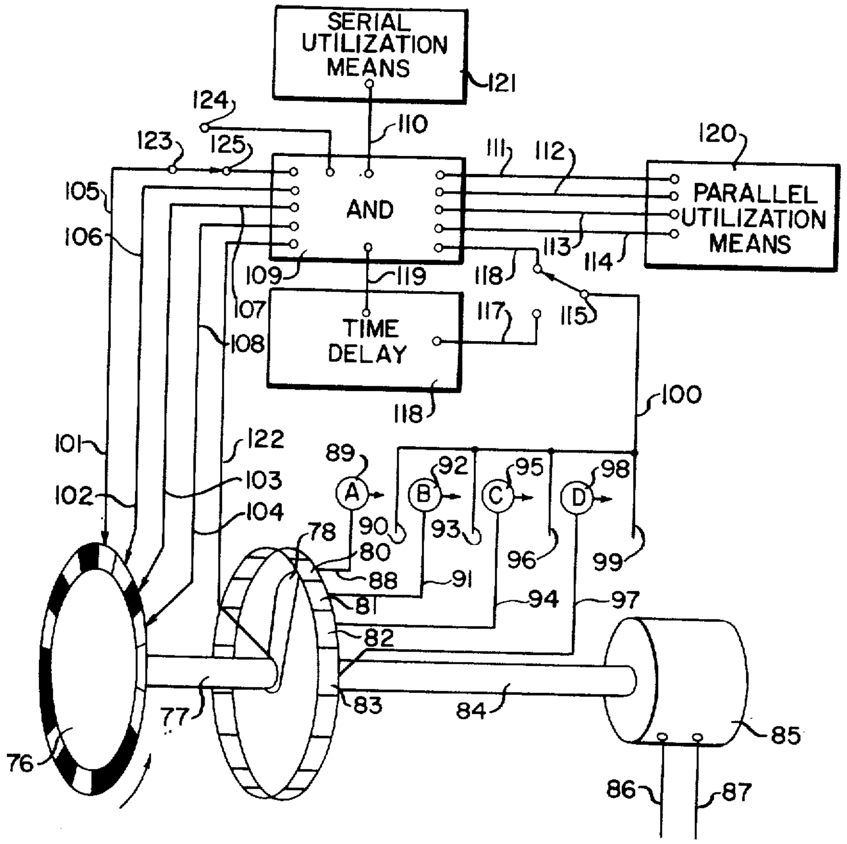
FIG. 6 shows a modified form of the present invention suitable for generalized use in generating serial or parallel coded signals from a single code wheel.

FIG. 6 shows the single code wheel generator or encoder of the present invention connected to generate coded signals either serially or in parallel. Code wheel 76 mounted on shaft 77 which carries sweeping contact arm 78 is rotated by suitable means such as motor 85, receiving power over leads 86 and 87, over shaft 84. Associated with code wheel 76 are pick up devices 101, 102, 103 and 104 the number of which depends on the level of the code to be generated as set forth above. The generation of coded signals is to be determined by keys 89, 92, 95, 98, etc., controlling switches 90, 93, 96 and 99 respectively and connected to the stationary commutator segments 80, 81, 82, 83, etc., over leads 88, 91, 94 and 97 respectively. Pick ups 101 thru 104 are connected to an AND gate 109 over leads 105, 106, 107 and 108 respectively. When a key, A designated 89 is pressed, as arm 78 rotates it comes to the position shown at which time the circuit through switch 90 and over leads 100 and 122 is completed and with switch 115 set to contact 116 activates AND gate 109 so that signals from pick-ups 101 thru 104 appearing over leads 105 thru 108 are passed at the same time and in parallel over leads 111, 112, 113 and 114 to the parallel utilization means 120. Thus pressing key 89 automatically and from a single code wheel produces a four level parallel output code signal to a utilization means.

The apparatus of FIG. 6 may also be utilized to generate the same codes set forth above for parallel output but as serial signals i.e. signals which appear in the output as discrete signals spaced in time. This may be accomplished by shifting switch 123 from contact 125 to 124 which connects pick up 101 to a serial output circuit in AND circuit 109 communicating with lead 110 to serial utilization means 121. Also switch 115 is connected to contact 117 so that contact 90, arm 78 to segment 80 complete a circuit to time delay 118 which passes to AND circuit 109 a pulse over lead 119 of a duration equal to the traverse of wheel 76 over four segment positions. This pulse activates the AND circuit long enough for the single pick-up 101 to traverse four segments of wheel 76 thereby generating the code for key 89 as above but in serial fashion. This serial code signal is also passed to Serial utilization means 121.

While the code wheels and tone wheels shown in the various figures of the drawing are illustrated and described as commutators having conducting segments and contact brushes or the like, or any other suitable means may be used such as photo-electric cells switched by light shining through holes or slots in a shutter disc. It is felt to be unnecessary to illustrate these alternate forms since their construction is well known in the art.

Thus has been shown a modification of the single wheel code signal generator under control of keys or similar devices and capable of generating multiple level coded signals either as simultaneous parallel signals or sequentially timed serial signals.

While only two code wheels have been shown and described together with two combinations for their use, many modifications will be apparent to those skilled in the art and within the spirit and scope of the invention as set forth in the appended claims.

What is claimed is:

1. In a high speed printing system, the combination of, a printing type carrier including means to move printing type in a predetermined order past a printing station, means to effect a transfer of information from the printing type to a recording medium, circuit means to initiate the information transfer in response to a predetermined signal, a comparator circuit to produce the predetermined signal in response to an information data signal and a printing type identification signal, a code wheel including rotatable support means and having code generating characteristics spaced apart in a predetermined arrangement, a plurality of parallel code detecting elements including couplings spaced apart about said code wheel for deriving predetermined combinations of signals from said code wheel which comprise coded representations of the characters on said type wheel, and hammer tone generating means on the support means with the code wheel for accurately timing the predetermined signal.

2. In a high speed printing system, the combination of, a printing type carrier supported rotatably on a drive shaft, means to effect a transfer of information from the printing type to a recording medium, circuit means to initiate the information transfer in response to a predetermined signal, a code wheel rotated by said shaft in step with said type carrier, a plurality of signal generating means spaced apart about said code wheel at least equal in number to the order of the code for deriving from said code wheel coded signals comprising coded representations of the characters on said type carrier, and hammer tone generating means on the support means with the code wheel for accurately timing the predetermined signal.

3. In a high speed printing system, the combination of, a printing type carrier to support a plurality of rows of similar characters and rotated by a drive shaft, means to effect a transfer of information from the printing type to a recording medium, circuit means to initiate the information transfer in response to a predetermined signal, means to generate the predetermined signal including a code wheel carrying signal producing means spaced apart about its periphery, a plurality of parallel read signal pick-up devices spaced apart to develop a plurality of coded signals representing said characters in which said code wheel is driven by said drive shaft, and hammer tone generating means on the support means with the code wheel for accurately timing the predetermined signal.

4. In a high speed printing system, the combination of, a printing type carrier supported rotatably on a drive shaft and adapted to carry a plurality of rows of printing type characters, a row of printing hammers, one for each of said rows of printing type, a code wheel driven by said shaft and having code generating characteristics in a predetermined spaced apart arrangement, a plurality of signal pick-up devices for deriving coded signals directly from said code wheel representing the characters on said type carrier in position for printing by said hammers, means for comparing coded signals with coded signals representing characters to be printed, means for energizing at least one of said hammers in accordance with a match between the two said coded signals, and hammer tone generating means on the support means with the code wheel for accurately timing the predetermined signal.

References Cited by the Examiner

UNITED STATES PATENTS

| | | | |
|---|---|---|---|
| 2,692,551 | 10/54 | Potter | 101—93 |
| 2,757,605 | 8/56 | Dumey | 101—93 |
| 2,787,952 | 4/57 | Roche | 101—93 |
| 2,805,620 | 9/57 | Rosen et al. | 101—93 |
| 2,915,967 | 12/59 | Gehring et al. | 101—93 |
| 2,918,865 | 12/59 | Wooding | 101—93 |
| 2,940,385 | 6/60 | House | 101—93 |
| 2,978,977 | 4/61 | Eckert et al. | 101—93 |
| 2,991,710 | 7/61 | Harwood | 101—93 |

WILLIAM B. PENN, *Primary Examiner.*